United States Patent [19]

Nakagaki et al.

[11] 4,379,303
[45] Apr. 5, 1983

[54] INK-JET RECORDING HEAD APPARATUS

[75] Inventors: Mitsuhiro Nakagaki; Osamu Isoo; Shinji Matsuoka, all of Hitachi; Takahiro Yamada, Ibaraki, all of Japan

[73] Assignee: Hitachi, Ltd., Tokyo, Japan

[21] Appl. No.: 287,874

[22] Filed: Jul. 29, 1981

[30] Foreign Application Priority Data

Jul. 29, 1980 [JP] Japan .................. 55/103186

[51] Int. Cl.³ .................................. G01D 15/18
[52] U.S. Cl. .......................................... 346/75
[58] Field of Search ................... 346/1.1, 75, 140

[56] References Cited

U.S. PATENT DOCUMENTS

| 3,596,275 | 7/1971 | Sweet | 346/1.1 |
| 3,683,212 | 8/1972 | Zoltan | 346/75 X |
| 3,708,118 | 1/1973 | Keur | 346/75 X |
| 4,138,687 | 2/1979 | Cha et al. | 346/75 |

Primary Examiner—Donald A. Griffin
Attorney, Agent, or Firm—Antonelli, Terry & Wands

[57] ABSTRACT

An ink-jet recording head apparatus of charge modulation and continuous jet type comprising an annular ink pump chamber defined by the inner peripheral face of a cylindrical electrostrictive element, the annular side faces of a pair of elastic sealing members and the outer peripheral face of a fluid passage-providing insert, a tortuous inlet path connecting the ink pump chamber to a supply source of ink under pressure, and a tortuous outlet path connecting the ink pump chamber to an ink ejection orifice.

9 Claims, 4 Drawing Figures

INK-JET RECORDING HEAD APPARATUS

BACKGROUND OF THE INVENTION

This invention relates to ink-jet recording head apparatus, and more particularly to an ink-jet recording head apparatus of charge modulation and continuous jet type.

A typical prior art one of ink-jet recording head apparatus is disclosed in, for example, U.S. Pat. No. 3,596,275. Such an ink-jet recording head apparatus is adapted for application to industrial service of printing records on, for example, bottles of refreshing beverages, fruits, etc. and is demanded to meet the following requirements:

(1) The apparatus can print records on a variety of kinds of articles which are different from one another in the material, ground color, surface configuration, etc.

(2) The apparatus can print, for example, various kinds of characters with dots of different diameters.

(3) The apparatus can operate satisfactorily under severe environmental conditions, for example, at temperatures of from 5° C. to 35° C.

In view of the above requirements, the following conditions are demanded for its head:

(1) In order to print records on a variety of kinds of articles various kinds of ink are required, and arrangements are required to deal with the various kinds of ink.

(2) Because of the requirement for injection of dots of various sizes, a variety of orifices of corresponding diameters must be prepared.

(3) The head is required to deal with changes in the physical properties of ink due to temperature changes.

An ink-jet recording head is disclosed in, for example, U.S. Pat. No. 3,708,118. In the prior art head disclosed in this U.S. patent, an ink pump chamber receiving a supply of ink under pressure is shaped in the form of a pipe, and an electrostrictive element or a piezo-electric element is disposed to surround the pipe. The vibration of the electrostrictive element is transmitted to writing fluid or ink in the pipe, and the resultant resonance of the fluid is utilized to amplify the vibration amplitude thereby producing droplets of ink to be ejected from the orifice.

The prior art head is so constructed that the orifice portion is fixed to the end of the pipe, and the electrostrictive element is fixed by a binder to the pipe to form an integral combination.

There is the following relation between the length l (meters) of the ink pipe, the velocity V (meters/second) of sound propagating through ink (which will be referred to hereinafter as an acoustic velocity in ink) and the resonance frequency f (kHz):

$$l = aV/\Delta f (a: 1, 3, 5, \ldots)$$

On the other hand, the diameter of the orifice is determined depending on the required diameter of dots depicting characters, and the velocity of ink flow is determined so as not to exceed the limit of laminar flow. Then, the nozzle excitation frequency suitable under the above conditions is determined.

After setting the fluid resonance frequency at the value of the nozzle excitation frequency thus determined, the kind of ink to be used is determined to determine the acoustic velocity in ink (the velocity of sound propagating through ink), so that the pipe length l can be determined according to the above equation.

The prior art head disclosed in U.S. Pat. No. 3,708,118 has been defective in the following points because the structure of the nozzle is limited by the factors above described:

(a) The length of the ink pipe must be changed depending on the kind of ink (hence, the acoustic velocity), and, therefore, the head must also be changed.

(b) The nozzle excitation frequency must be changed depending on the diameter of the orifice. Consequently, the length of the ink pipe must be changed, and the head having such a pipe length must be employed.

(c) A change in the temperature results in a corresponding change in the physical properties of ink, hence, in a corresponding change in the acoustic velocity in ink. Consequently, ink droplets would not be stably produced, when the temperature tends to change.

In such an ink-jet head of resonant type, the vibration of the electrostrictive element is transmitted indirectly to ink through the walls defining the ink pump chamber.

As another type different from such a resonant type, an ink-jet head constructed to directly transmit the vibration energy to ink is disclosed in, for example, U.S. Pat. No. 3,683,212. The ink-jet head disclosed in this U.S. patent employs a piezoelectric ceramic disc, and the vibration of the ceramic disc is imparted to ink portions in contact with the outer periphery of the ceramic disc. More precisely, the vibration of the ceramic disc is transmitted radially outward from the center of the ceramic disc, that is, in a divergent direction. Consequently, the efficiency of utilization of the vibration energy has been low, and it has been difficult to stably produce ink droplets ejected from the orifice. Further, due to the fact that ink makes direct contact with the ceramic disc at only the outer periphery of the latter, it has been difficult to increase the effective area of the disc serving to impart the vibration energy to ink.

SUMMARY OF THE INVENTION

It is an object of the present invention to provide an ink-jet recording head apparatus which finds useful industrial applications.

Another object of the present invention is to provide an ink-jet recording head apparatus which can print records on a variety of kinds of articles without the necessity for replacement of its head and in which the efficiency of energy transmission from its electrostrictive element is greatly improved.

The ink-jet recording head apparatus according to the present invention is featured by the following facts:

(1) An annular ink pump chamber is defined by the inner peripheral face of a cylindrical electrostrictive element, the annular side faces of a pair of elastic sealing members and the outer peripheral face of a fluid-passage providing insert.

(2) The annular ink pump chamber is connected between a supply source of ink under pressure and an ink ejection orifice by a tortuous inlet path and a tortuous outlet path respectively.

The ink-jet recording head apparatus of the present invention having the structural features above described provides the following advantages:

(a) The recording head apparatus is of the non-resonant type, and, there is no need for replacement of its recording head depending on the kind of articles to be printed with records and depending on the kind of ink used for recording.

(b) The energy from the electrostrictive element is directly transmitted to ink, and the energy is radiated from the inner peripheral face of the cylindrical electrostrictive element toward the center of the cylinder, that is, in a convergent direction, thereby greatly improving the efficiency of energy transmission from the element to ink.

(c) The tortuous arrangement of ink passages formed in the fluid-passage providing insert exhibits the effect similar to that exhibited by a fluid diode. The internal fluid passages have a relatively small diameter, and, therefore, the velocity of ink flowing through the passages is high, so that air bubbles entrained in the stream of ink can be easily purged.

DESCRIPTION OF THE PREFERRED EMBODIMENTS

Figure 1:
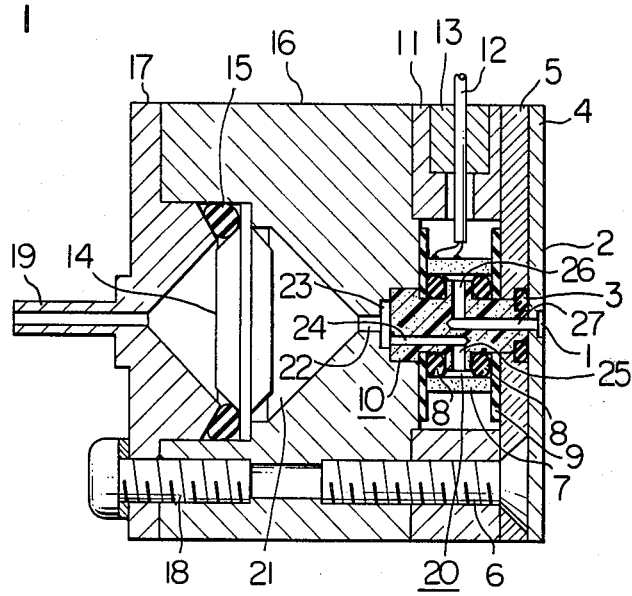
FIG. 1 is a longitudinal sectional view showing the structure of an embodiment of the ink-jet recording head apparatus according to the present invention.

Referring to FIG. 1, an embodiment of the ink-jet recording head apparatus according to the present invention includes an ink ejection orifice 1, an orifice plate 2, an orifice seal 3, an orifice plate retainer 4, an orifice base 5, orifice base set-screws 6, a cylindrical electrostrictive element 7, a pair of O-ring 8 of elastic sealing material, a pair of packings 9, a ceramic insert 10 having ink passages formed therein, a spacer 11, a pair of leads 12, and a lead bushing 13.

The apparatus further includes a filter 14, a filter seal 15, a filter casing 16, an end bracket 17 and end bracket setscrews 18.

Ink supplied through an ink supply port 19 from a source of ink under pressure (not shown) flows into an ink pump chamber 20 through the filter 14, a filter chamber 21, a first ink passage 22, a second ink passage 23, a third ink passage 24 and a fourth ink passage 25 and flows out from the ink pump chamber 20 toward the ink ejection orifice 1 through a fifth ink passage 26 and a sixth ink passage 27.

Thus, the end bracket 17 with which the ink supply port 19 is integrally provided, the filter 14, and the filter casing 16 having the first and second ink passages 22 and 23 formed therein constitute the ink supply section.

The cylindrical electrostrictive element 7 radiating the vibration energy for formation of ink droplets to be ejected from the orifice 1 is electrically connected to the leads 12 supported in the lead bushing 13 mounted in the spacer 11.

Figure 3:
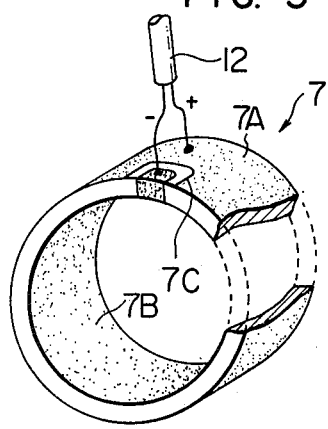
FIG. 3 is a partly cutaway, perspective view showing, in an enlarged scale, the cylindrical electrostrictive element and its electrodes employed in the embodiment of the present invention shown in FIG. 1.

As shown in FIG. 3, a pair of electrodes 7A and 7B are provided on the outer and inner peripheral surfaces respectively of the cylindrical electrostrictive element 7, and a portion of the electrode 7B extends into a cutout 7C formed in a portion of the electrode 7A. Therefore, the leads 12 can be connected to the electrodes 7A and 7B respectively at the outer peripheral surface only of the cylindrical electrostrictive element 7.

The orifice plate 2 provided with the ink ejection orifice 1 is fixed to the orifice base 5 by the orifice plate retainer 4 with the orifice seal 3 interposed therebetween, to constitute the orifice section ejecting ink in droplet form.

Disposed between the ink supply section and the orifice section is the ceramic insert 10 in which the passages of ink flowing toward the orifice section is formed and which supports the cylindrical electrostrictive element 7 with the O-rings 8 of elastic sealing material interposed therebetween.

The annular or ring-shaped ink pump chamber 20 is defined by the annular side faces of the two O-rings 8, the inner peripheral face of the cylindrical electrostrictive element 7 and the outer peripheral face of the ceramic insert 10. The third ink passage 24 communicating with the ring-shaped ink pump chamber 20 through the fourth ink passage 25 in the ceramic insert 10 is connected through the second ink passage 23 to the first ink passage 22 in the ink supply section.

The ink passage arrangement in the ceramic insert 10 is such that the third ink passage 24 is connected in substantially orthogonal relation with the second ink passage 23 connected in substantially orthogonal relation with the first ink passage 22 in the ink supply section, the third ink passage 24 being disposed on the side remote from the first ink passage 22 relative to the second ink passage 23 with its axis being displaced from that of the first ink passage 22; the fourth ink passage 25 is connected in substantially, orthogonal relation with the third ink passage 24 and communicates with the ink pump chamber 20; and the fifth ink passage 26 is connected in substantially orthogonal relation with the ink pump chamber 20 at a position not interfering with the fourth ink passage 25 and connected also in substantially orthogonal relation with the sixth ink passage 27 terminating in the ink ejection orifice 1.

Thus, the illustrated ink-jet recording head apparatus is of the type having the so-called non-resonant nozzle for forming droplets of ink.

Figure 2:
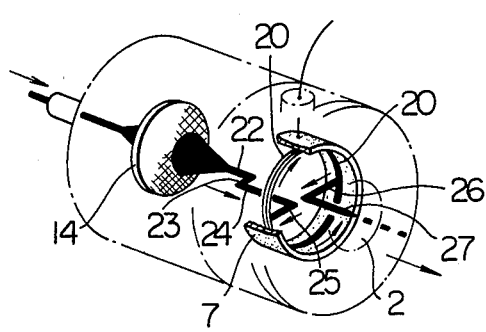
FIG. 2 is a partly cutaway, schematic perspective view to clearly show the internal flow of ink in the embodiment of the present invention shown in FIG. 1.

It will be apparent from FIG. 2 that the ink pump chamber 20 is substantially annular in shape, that the ink passages 22 to 25 and 26, 27 are bent to cross each other at substantially right angles, that the ink passages 25 and 26 lie on the same diametral line extending in orthogonal relation with respect to the central axis of the cylindrical electrostrictive element 7, and that the ink passages 25 and 26 extend in substantially symmetrical relation with respect to the central axis of the element 7.

The meritorious effects of the embodiment of the present invention resulting from the unique structure above described will now be described in detail.

Ink under pressure supplied through the ink supply port 19 from the source (not shown) flows through the filter 14 into the first ink passage 22 communicating through the second ink passage 23 with the third ink passage 24 in the ceramic insert 10. The ceramic insert 10 and the filter casing 16 are made of different materials by reasons of manufacturing conveniences and are assembled together while ensuring freedom from leakage of ink at the joint.

As described hereinbefore, the ring-shaped ink pump chamber 20 is defined by the inner peripheral face of the cylindrical electrostrictive element 7, the annular side faces of the two O-rings 8 and the outer peripheral face of the ceramic insert 10. This shape is determined by consideration of the two factors described presently.

According to the first factor, the dimension of the inner diameter of the cylindrical electrostrictive element 7 is fixed, and the contact area between the fluid and the annular inner peripheral face portion of the cylindrical electrostrictive element 7, that is, the distance between the two O-ring 8 is then determined on the basis of the magnitude of energy applied from the cylindrical electrostrictive element 7 to the fluid for forming the droplets of fluid to be ejected from the orifice 1.

According to the second factor, the sectional area of the fluid passages, hence, the dimension of the outer diameter of the ceramic insert 10 (the dimension of the outer peripheral face portion of the ceramic insert 10 opposite to the corresponding inner peripheral face portion of the cylindrical electrostrictive element 7) is determined from the viewpoint of purging fine air bubbles from the fluid in the ink pump chamber 20. Thus, the shape of the ink pump chamber 20 is determined by consideration of the first factor based on the energy required for forming ink droplets and the second factor based on the viewpoint of purging air bubbles.

Presence of air bubbles in the ink passages is objectionable for the purpose of ink droplet formation since the efficiency of transmission of energy from the electrostrictive element 7 is greatly lowered. According to the present invention, the diameter of the ink passages is selected to be relatively small, so that ink flows at a relatively high velocity, and air bubbles can be easily purged.

In the present invention, the axis of the third ink passage 24 communicating with the ink pump chamber 20 through the fourth ink passage 25 is displaced from that of the first ink passage 22 and is connected to the first ink passage 22 through the second ink passage 23 which is bent at substantially right angles with the first and third ink passages 22 and 24, as described already. The displacement of the axis of the third ink passage 24 from that of the first ink passage 22 exhibits such effects that the ceramic insert 10 can be made compact in its axial dimension or length, and the ink pump chamber 20 can be made compact in its transverse width, that is, the dimension or length in the axial direction of the ceramic insert 10.

In the present invention, the individual ink passages have an area smaller than the cross-sectional area of the ink pump chamber 20 and have a length which will not produce resonance of the fluid therein, that is, a length smaller than ¼ of the wavelength determined by the excitation frequency and the acoustic velocity of ink.

The fourth and fifth ink passages 25 and 26 are preferably disposed in a relation symmetrical with each other with respect to the center of the ink pump chamber 20 so that they are located on the same diametral line of the ring-shaped ink pump chamber 20. In the present invention, writing ink flows through the inlet path composed of the first, second, third and fourth ink passages 22, 23, 24 and 25 before entering the ink pump chamber 20 and then flows out from the ink pump chamber 20 to pass through the outlet path composed of the fifth and sixth ink passages 26 and 27 before it is ejected in droplet form from the ink ejection orifice 1. This is the forward flow of ink. The writing ink to which the energy is applied from the electrostrictive element 7 in the ink pump chamber flows preferably in the forward direction, and it is not preferable that the ink flows in the reverse direction. To this end, fluid diodes are generally used in such ink passages according to the common practice. In the embodiment of the present invention, the tortuous ink passages, especially, the second to fourth ink passages 23 to 25 perform the function of fluid diodes. When the diameter of the ink passages in the inlet path is selected to be smaller than that of the ink passages in the outlet path, the fluid diode effect can be further enhanced.

No resonance of the fluid occurs in the ink pump chamber 20 since this passage is ring-shaped (annular).

In the present invention, the cylindrical electrostrictive element 7 is supported at its inner peripheral portions by the two O-rings 8 of elastic material so that the element 7 can be insulated against vibrations that may be transmitted from the surrounding structural members tending to cause its mechanical resonance.

On the other hand, the ink ejection orifice 1 is integrally fixed to the orifice plate 2 which is fixed to the orifice base 5 by the orifice plate retainer 4.

The filter casing 16 to which the ceramic insert 10 is jointed is assembled with the spacer 11 and orifice base 5 by two orifice base setscrews 6 (only one of which is shown). When an ink ejection orifice having a different diameter is required or when nozzle clogging has occurred, it is merely necessary to take off the two setscrews (not shown) fixing the orifice plate retainer 4 to the orifice base 5, so as to permit simple replacement of the orifice.

As shown in FIG. 3, the electrodes 7A and 7B provided on the outer and inner peripheral surfaces of the cylindrical electrostrictive element 7 are positive and negative respectively. The leads 12 extending from the positive and negative electrodes 7A and 7B pass through the spacer 11 and are sealed by the lead bushing 13 to be connected to an excitation source disposed externally of the apparatus.

Alternatively, the negative electrode 7B may not be provided, and, utilizing the fact that ink is electrically conductive, one of the nozzle parts making contact with ink may be made of an electrical conductive material and connected to the external excitation source.

In the embodiment of the present invention, a stainless steel of, for example, grade SUS 304 (Japanese Industrial Standards) is used to make the members including the orifice base 5 and filter casing 16, and the packings 9 are made of an electrical insulator such as rubber so that the positive and negative electrodes 7A and 7B provided on the outer and inner peripheral surfaces respectively of the cylindrical electrostrictive element 7 may not be short-circuited by the surrounding members of stainless steel.

The filter 14 housed within the filter casing 16 can be simply taken out for replacement by taking off the two end-bracket setscrews 18 (only one of which is shown) and then removing the filter seal 15.

In summary, the aforementioned embodiment of the present invention can exhibit the following effects:

(1) Air bubbles can be purged satisfactorily from the ink pump chamber and the ink passages connected thereto, so that ink droplets can be formed quickly and stably.

(2) By virtue of the use of the O-rings of elastic material, the cylindrical electrostrictive element acting as the source of energy radiation can be elastically supported to be insulated against vibrations which may be transmitted from the surrounding members tending to cause its mechanical resonance.

(3) By virtue of the provision of the tortuous ink passages exhibiting the function of fluid diodes, the energy radiated from the cylindrical electrostrictive element for forming droplets of ink can be fully efficiently utilized.

(4) Ink droplets can be stably produced since no resonance of fluid occurs in the fluid passages and ink pump chamber.

In the aforementioned embodiment of the present invention, the packings and O-rings may be integrally formed of an elastic material such as rubber to provide a one-piece elastic element.

Figure 4:
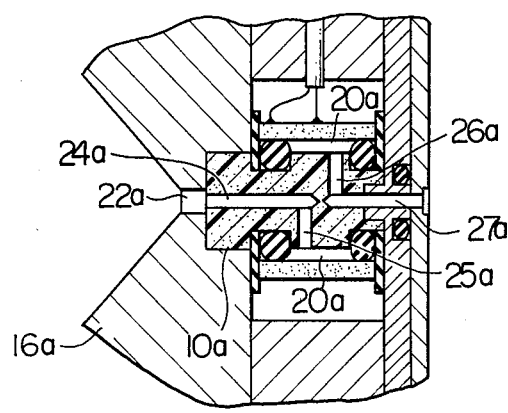
FIG. 4 is a longitudinal sectional view showing the structure of part of another embodiment of the present invention.

FIG. 4 is a sectional view of principal parts, associated with an ink pump chamber, of another embodiment of the present invention.

Referring to FIG. 4, the second embodiment includes a ceramic insert 10a, a filter casing 16a, and ink passages 22a, 24a, 25a, 26a and 27a corresponding to the first, third, fourth, fifth and sixth ink passages 22, 24, 25, 26 and 27 respectively in the first embodiment.

This second embodiment is featured by the fact that the distance between the O-rings, that is, the transverse width of the ink pump chamber 20a is larger than that in FIG. 1; that the third ink passage 24a connected in coaxial relation with the first ink passage 22a is provided in the ceramic insert 10a; that the sixth ink passage 27a terminating in the ink injection orifice is disposed in coaxial relation with the third ink passage 24a; and that the fourth and fifth ink passages 25a and 26a are connected at substantially right angles with the third and sixth ink passages 24a and 27a respectively.

Thus, the ink passage arrangement is simplified in the second embodiment so that the apparatus can be produced at a higher yield rate.

Although the aforementioned fluid diode effect is slightly reduced, that is, the absence of the ink passage 23 results in a corresponding reduction of the fluid diode effect in the case of the second embodiment, such a reduction in the fluid diode effect can be covered by the widened interval between the O-rings.

It will be appreciated from the foregoing detailed description that the present invention can provide an ink-jet recording head apparatus of non-resonant type which shows the desired versatility to the dimensional requirement for the diameter of the ink ejection orifice in the nozzle and also to the velocity requirement for the acoustic velocity of ink used for recording, and which therefore finds a variety of practical industrial applications.

We claim:

1. An ink-jet recording head apparatus of charge modulation type comprising a source supplying writing fluid or ink under pressure, a cylindrical electrostrictive element imparting energy to said ink for forming droplets of ink, an orifice for ejecting said ink droplets therefrom, annular sealing members of elastic material making partial engagement with said electrostrictive element for defining an annular ink pump chamber, and a fluid passage-providing member of cylindrical shape supporting said sealing members and defining an inlet path between said ink pump chamber and said ink supply source and an outlet path between said ink pump chamber and said orifice, said ink pump chamber being defined by the inner peripheral face of said cylindrical electrostrictive element, the annular side faces of said sealing members and the outer peripheral face of said fluid passage-providing member.

2. An apparatus as claimed in claim 1, wherein said inlet path and said outlet path are both tortuous.

3. An apparatus as claimed in claim 1, wherein said inlet path is composed of a first fluid passage communicating with said ink supply source and extending in substantially coaxial relation with said annular ink pump chamber, a second fluid passage connected in substantially orthogonal relation with said first fluid passage, a third fluid passage connected in substantially orthogonal relation with said second fluid passage and extending in substantially parallel relation with the axis of said annular ink pump chamber and a fourth fluid passage connected in substantially orthogonal relation with said third fluid passage and connected also in substantially orthogonal relation with said annular ink pump chamber, and said outlet path is composed of a fifth fluid passage connected in substantially orthogonal relation with said annular ink pump chamber and a sixth fluid passage connected in substantially orthogonal relation with said fifth fluid passage and extending in substantially parallel relation with the axis of said annular ink pump chamber to terminate in said orifice.

4. An apparatus as claimed in claim 3, wherein said third and sixth fluid passages are not aligned on the same axis.

5. An apparatus as claimed in claim 3 or 4, wherein said fourth and fifth fluid passages are disposed on the same diametral line of said annular ink pump chamber.

6. An apparatus as claimed in claim 3, wherein said third and sixth fluid passages are aligned on the same axis.

7. An apparatus as claimed in claim 1, wherein said inlet path is composed of a sixth fluid passage communicating with said ink supply source and extending in substantially coaxial relation with said annular ink pump chamber and a seventh fluid passage connected in substantially orthogonal relation with said sixth fluid passage and said annular ink pump chamber, and said outlet path is composed of an eighth fluid passage connected in substantially orthogonal relation with said annular ink pump chamber and a ninth fluid passage connected in substantially orthogonal relation with said eighth fluid passage and extending in substantially parallel relation with the axis of said annular ink pump chamber to terminate in said orifice.

8. An apparatus as claimed in claim 7, wherein said sixth and ninth fluid passages are aligned on the axis of said annular ink pump chamber.

9. An apparatus as claimed in claim 7 or 8, wherein said seventh and eighth fluid passages are disposed in a plane including the diameter and axis of said annular ink pump chamber but are not aligned on the same axis.

* * * * *